(12) United States Patent
Schuster

(10) Patent No.: US 11,872,497 B1
(45) Date of Patent: Jan. 16, 2024

(54) CUSTOMER-GENERATED VIDEO GAME PLAYER MATCHMAKING IN A MULTI-TENANT ENVIRONMENT

(71) Applicant: Amazon Technologies, Inc., Seattle, WA (US)

(72) Inventor: Brian J. Schuster, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 17/390,169

(22) Filed: Jul. 30, 2021

(51) Int. Cl.
*A63F 13/795* (2014.01)
*G06F 16/955* (2019.01)
*A63F 13/85* (2014.01)

(52) U.S. Cl.
CPC ............ *A63F 13/795* (2014.09); *A63F 13/85* (2014.09); *G06F 16/955* (2019.01); *A63F 2300/5566* (2013.01)

(58) Field of Classification Search
CPC .................... A63F 13/85; A63F 13/795; A63F 2300/5566; G06F 16/955
USPC .......................................................... 463/42
See application file for complete search history.

(56) References Cited

U.S. PATENT DOCUMENTS

| | | | | |
|---|---|---|---|---|
| 2009/0307234 A1* | 12/2009 | Zrike | ................. | G09B 19/0038 709/204 |
| 2009/0325709 A1* | 12/2009 | Shi | ........................ | G06Q 10/10 463/42 |
| 2011/0320375 A1* | 12/2011 | Zrike | ................... | G06Q 10/109 705/319 |
| 2016/0027260 A1* | 1/2016 | Pierce | ................. | G07F 17/3276 463/7 |
| 2016/0260032 A1* | 9/2016 | Woon | ..................... | G06Q 10/02 |
| 2017/0106290 A1* | 4/2017 | Pierce | ................... | A63F 13/798 |
| 2017/0300935 A1* | 10/2017 | Herbst | ............... | G06Q 30/0201 |
| 2018/0018742 A1* | 1/2018 | Leonard | ................. | G07C 13/00 |
| 2018/0130139 A1* | 5/2018 | Hurley | ................ | G06Q 50/01 |
| 2019/0236722 A1* | 8/2019 | Bhat | ..................... | G06Q 20/386 |
| 2020/0376389 A1* | 12/2020 | Rice | ........................ | A63F 13/35 |
| 2022/0314126 A1* | 10/2022 | Goldman | ............... | A63F 13/795 |
| 2022/0318887 A1* | 10/2022 | Sawaf | .................... | G06N 20/00 |

* cited by examiner

*Primary Examiner* — Michael A Cuff
(74) *Attorney, Agent, or Firm* — BakerHostetler

(57) ABSTRACT

A selection to use a customer-generated matchmaking algorithm is received, by a multi-tenant gaming service, from a first customer. Indications of a plurality of video game player matchmaking requests and corresponding player characteristic data are provided, by the multi-tenant gaming service, for processing by the customer-generated matchmaking algorithm. An indication of a first player match determined by the customer-generated matchmaking algorithm, based on the video game player matchmaking requests and the player characteristic data, is received, by the multi-tenant gaming service. The first player match may be between at least a first player and a second player. Execution of a first video game session to which the first player and the second player are connected is hosted, by the multi-tenant gaming service.

19 Claims, 8 Drawing Sheets

Match Reporting API Call 501 (from Customer-Generated Matchmaking Algorithm 110)

- Match AAA
- Player A, Player B
- (Player A, Team 001)(Player B, Team 002)
- Match BBB
- Player C, Player D
- (Player C, Team 003)(Player D, Team 004)
- Matchmaking Status = Continuing Match Reporting API Call 502 (from Customer-Generated Matchmaking Algorithm 110)

- Match CCC
- Player E, Player F, Player G, Player H
- (Player E, Team 005)(Player F, Team 006)(Player G, Team 005)(Player H, Team 006)
- Matchmaking Status = Complete

FIG. 5

CUSTOMER-GENERATED VIDEO GAME
PLAYER MATCHMAKING IN A
MULTI-TENANT ENVIRONMENT

BACKGROUND

Over the past few years, video games have become increasingly popular. Video game matchmaking is a process is in which a set of players may be evaluated, and different subsets of the players may be matched together into different video game matches. In some examples, the players may be matched together based at least in part on player characteristics, such as player skill levels, desired characters that the players would like to control, game maps that the players would like to play on, and the like. Players may sometimes be matched together into a new video game session or may be matched with existing players into an existing video game session. In some examples, matchmaking may be performed by a gaming service, such as a multi-tenant gaming service that hosts execution of video game sessions for a plurality of different customers.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating example match reporting API calls that may be used in accordance with the present disclosure.

DETAILED DESCRIPTION

Figure 1:
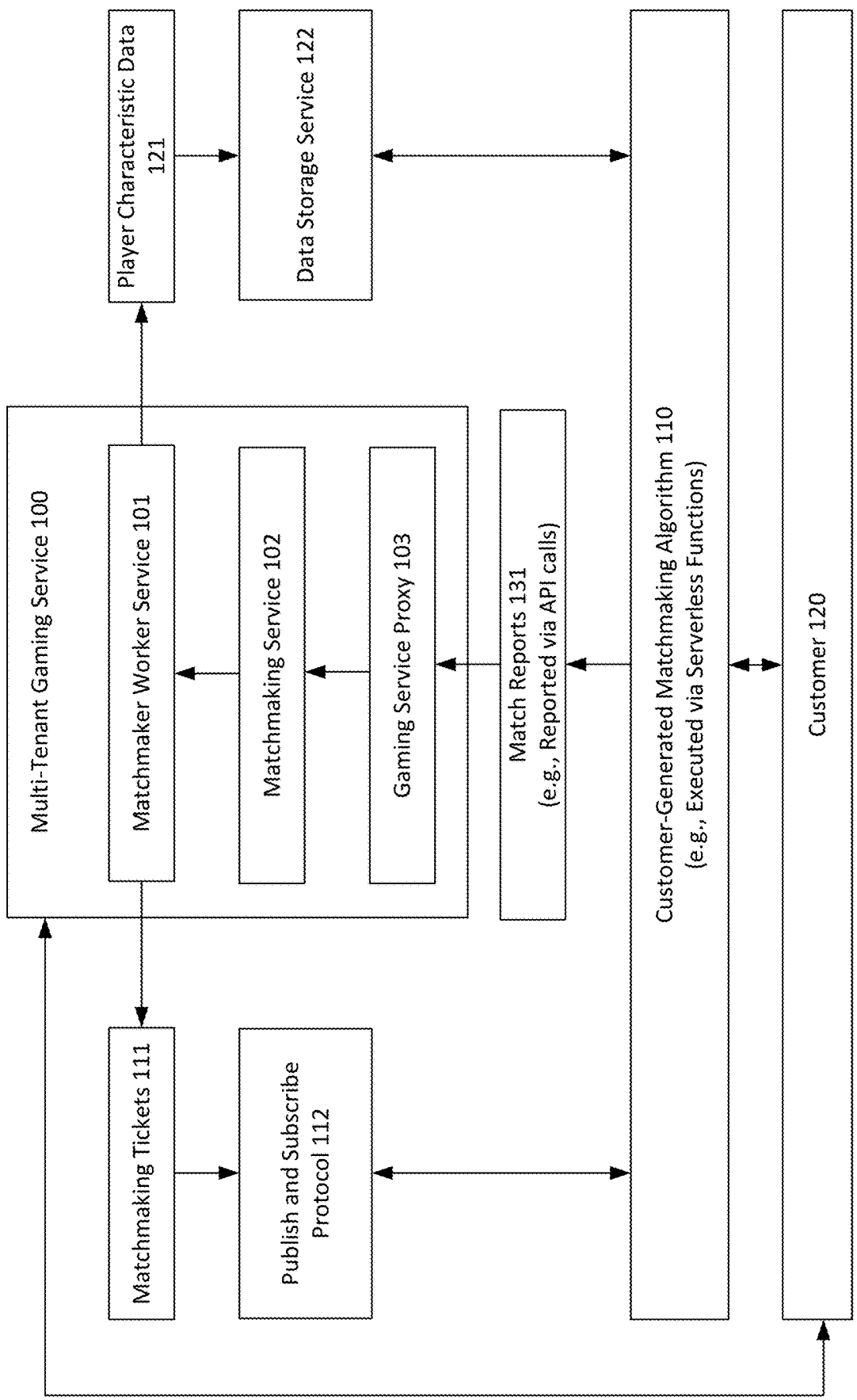
FIG. 1 is a diagram illustrating an example customer-generated matchmaking algorithm implementation system that may be used in accordance with the present disclosure.

Techniques for customer-generated video game player matchmaking in a multi-tenant environment are described herein. In some examples, a gaming service may allow an individual customer to employ a customer-generated matchmaking algorithm for use in matching video game players together into different game sessions. The gaming service may be a multi-tenant gaming service, which is a gaming service that hosts execution of video game sessions for a plurality of different customers (e.g., developers). Each customer may pay the gaming service for the use of resources (e.g., game servers) that are employed to host game sessions on behalf of the customer. In some examples, the gaming service may provide its own service-generated matchmaking algorithm. The gaming service may allow each individual customer to select either a service-generated matchmaking algorithm or a customer-generated matchmaking algorithm for use in matching players to game sessions hosted on behalf of the customer. In some examples, the gaming service may provide a matchmaking configuration application programming interface (API) call, which may be issued by a customer and may allow the customer to indicate whether a service-generated matchmaking algorithm or a customer-generated matchmaking algorithm will be used for a respective group of video game sessions.

In some existing conventional matchmaking scenarios, a gaming service may allow an individual customer to select a limited set of rules that may be used in combination with a service-generated matchmaking algorithm. For example, a customer may be capable of selecting features such as team size, relative player skill levels for the teams, and the like. However, the use of customer-selected rules with a service-generated matchmaking algorithm is different from a scenario in which a customer generates (e.g., creates code for) the customer's own matchmaking algorithm (i.e., a customer-generated matchmaking algorithm). For example, allowing the use of a customer-generated matchmaking algorithm may offer a number of advantages. Specifically, allowing the use of customer-generated matchmaking algorithms may save time for customers in scenarios when customers have already generated (e.g., coded) their matchmaking algorithm. Additionally, allowing the use of customer-generated matchmaking algorithms may be more efficient by allowing customers to easily transport their algorithms between different gaming services. Furthermore, allowing the use of customer-generated matchmaking algorithms may be beneficial for scenarios in which a customer wishes to employ features that are not supported by a service-generated matchmaking algorithm and/or customer-selectable rules.

In some examples, matchmaking requests may be received by the gaming service, and corresponding matchmaking tickets may be created and queued. The matchmaking tickets are indications of corresponding matchmaking requests. The matchmaking tickets may include indications of the players associated with the corresponding ticket/request as well as other related information. In some examples, a set (e.g., batch) of matchmaking tickets may be obtained (e.g., consumed from the front of a queue) and provided for processing by a customer-generated matchmaking algorithm. In some cases, the set of matchmaking tickets may be provided to the customer-generated matchmaking algorithm using a publish and subscribe protocol. For example, the matchmaking tickets may be provided to the customer-generated matchmaking algorithm by a monitoring service that is integrated with the multi-tenant gaming service and that allows indications of events to be routed to targets based on one or more rules.

The customer-generated matchmaking algorithm may then use the matchmaking tickets to assist in finding matches between different subsets of players. In some examples, the customer-generated matchmaking algorithm may be executed by one or more serverless computing functions whose execution may be triggered based on receipt of the matchmaking tickets. The use of serverless computing functions may reduce costs and increase efficiency, such as by allowing customers to pay based on execution of the algorithm (e.g., as opposed to paying for the use of dedicated computing resources for execution of the algorithm).

In addition to the matchmaking tickets, the gaming service may also provide player characteristic data corresponding to the players that are being matched. The player characteristic data may indicate respective player characteristics, such as player skill levels, desired characters that the players would like to control, game maps that the players would like to play on, and the like. The player characteristic data may also assist the customer-generated matchmaking algorithm in finding matches between different subsets of players. In some examples, the gaming service may provide the player characteristic data to a data storage service, which may store the player characteristic data. Additionally, in some examples, each of the matchmaking tickets that is provided to the customer-generated matchmaking algorithm may include a link to corresponding player characteristic data for the player(s) to which the ticket corresponds. The link may be used, by the customer-generated matchmaking algorithm, to retrieve the corresponding player characteristic data from the data storage service. In some cases, this may be a time-limited link that is only valid for a configurable time period, such as a pre-signed uniform resource locator (URL). Thus, the use of a time-limited link may help to improve security for the player characteristic data, such as by limiting access to the player characteristic data to only a configurable time period after the time limited link is activated. In some examples, the time-limited link may be activated just before the matchmaking tickets are provided to the customer-generated matchmaking algorithm. It is noted that other security techniques may additionally or alternatively be employed for accessing of the player characteristic data, such as encryption keys and the like.

The customer-generated matchmaking algorithm may then determine player matches based on the matchmaking tickets and corresponding player characteristic data. In some examples, this may include determinations of players that are assigned to a match as well as team selections for those players. When the customer-generated matchmaking algorithm finds matches between players, the customer-generated matchmaking algorithm may report the matches back to the gaming service. In some examples, the customer-generated matchmaking algorithm may report the matches to the gaming service via a match reporting API call of the gaming service. In one specific example, for each match determined by the customer-generated matchmaking algorithm, the match reporting API call may include indications of the players within the match, mappings between the players and their respective teams, and other related information. The match reporting API call may also include an indication of whether the matchmaking process is continuing or completed. If the matchmaking process is continuing, this means that the customer-generated matchmaking algorithm is still evaluating the matchmaking tickets and player characteristic data and still attempting to form matches between players. If the matchmaking process is completed, this means that the customer-generated matchmaking algorithm is finished evaluating the matchmaking tickets and player characteristic data and is no longer attempting to form matches between players.

Thus, the match reporting API call may be issued multiple times by the customer-generated matchmaking algorithm for a given set of matchmaking tickets. This may allow the customer-generated matchmaking algorithm to report matches as they are determined, as opposed to waiting to find all matches and then reporting all determined matches at once. For example, a first API call may be issued to report a first determined match, and this first API call may indicate that the matchmaking status is continuing. A second API call (and optionally additional API calls) may then subsequently be issued to report additional matches that are determined after the first API call. It is not required that the customer-generated matchmaking algorithm must find a match for every player that is included in a set of matchmaking requests.

Upon receipt of a match reporting API call (or other indication of a reported match), the gaming service may proceed to perform various operations associated with implementation of the match. For example, if the players are matched into a new game session, the gaming service may launch the new game session and host execution of the new game session. Additionally, the matched players may connect to the game session. Furthermore, in some examples, when the customer-generated matchmaking algorithm has completed the matchmaking evaluation process for a given set of matchmaking tickets, this may be reported to the game service, such as by indicating that the matchmaking status is complete via the match reporting API call. Upon receiving a report that the matchmaking status is complete, the gaming service may provide a subsequent set of matchmaking tickets to the customer-generated matchmaking algorithm, and the process may be repeated.

FIG. 1 is a diagram illustrating an example customer-generated matchmaking algorithm implementation system that may be used in accordance with the present disclosure. As shown in FIG. 1, a customer 120 of multi-tenant gaming service 100 has selected to employ a customer-generated matchmaking algorithm 110 for use in matching video game players together into different game sessions. Customer 120 may be a video game developer. As should be appreciated, in addition to customer 120, multi-tenant gaming service 100 may have any number of additional customers (not shown in FIG. 1). In some examples, matchmaking requests may be received by the multi-tenant gaming service 100, and corresponding matchmaking tickets 111 may be created and queued. The matchmaking tickets 111 are indications of corresponding matchmaking requests. The matchmaking tickets 111 may include indications of the player(s) associated with the corresponding requests as well as other related information.

In some examples, a matchmaker worker service 101 may provide matchmaking tickets 111 for processing by the customer-generated matchmaking algorithm 110. In the example of FIG. 1, the matchmaking tickets 111 are provided to the customer-generated matchmaking algorithm 110 via publish and subscribe protocol 112. For example, the matchmaking tickets may be provided to the customer-generated matchmaking algorithm 110 by a monitoring service that is integrated with the multi-tenant gaming service 100 and that allows indications of events to be routed to targets based on one or more rules. In some examples, the matchmaking tickets 111 may be provided in successive sets (e.g. batches), and each set may be processed together by the customer-generated matchmaking algorithm 110. Specifically, the customer-generated matchmaking algorithm 110 may use the matchmaking tickets 111 to assist in finding matches between different subsets of players. In some examples, the customer-generated matchmaking algorithm 110 may be executed by one or more serverless computing functions whose execution may be triggered based on receipt of a set of the matchmaking tickets 111. The use of serverless computing functions may reduce costs and increase efficiency, such as by allowing customer 120 to pay based on execution of the customer-generated matchmaking algorithm 110 (e.g., as opposed to paying for the use of dedicated computing resources for execution of the customer-generated matchmaking algorithm 110). Additionally, in some examples, the matchmaking tickets 111 may be enqueued into a queue from which they are obtained by the customer-generated matchmaking algorithm 110.

The matchmaker worker service 101 also provides player characteristic data 121 corresponding to the matchmaking tickets 111. The player characteristic data 121 may indicate respective player characteristics for players associated with matchmaking tickets 111, such as player skill levels, desired characters that the players would like to control, game maps that the players would like to play on, and the like. The player characteristic data 121 may also assist the customer-generated matchmaking algorithm 110 in finding matches between different subsets of players. In some examples, the matchmaker worker service 101 may provide the player characteristic data 121 to a data storage service 122, which may store the player characteristic data 121. Additionally, in some examples, each of the matchmaking tickets 111 that is provided to the customer-generated matchmaking algorithm 110 may include a link to corresponding player characteristic data 121 for the player(s) to which the ticket corresponds. The link may be used, by the customer-generated matchmaking algorithm 110, to retrieve the corresponding player characteristic data 121 from the data storage service 122.

As shown in FIG. 1, the customer-generated matchmaking algorithm 110 may determine matches based on the matchmaking tickets 111 and player characteristic data 121. When the customer-generated matchmaking algorithm 110 finds matches between players, the customer-generated matchmaking algorithm 110 may submit match reports 131 back to the multi-tenant gaming service 100. The match reports 131 are reports of matches that are determined by the customer-generated matchmaking algorithm 110. In some examples, the match reports 131 may include indications of players that are assigned to a match as well as team selections for those players. Additionally, in some examples, the match reports 131 may be made via a match reporting API call of the multi-tenant gaming service 100. In one specific example, for each match determined by the customer-generated matchmaking algorithm 110, the match reporting API call may include indications of the players within the match, mappings between the players and their respective teams, and other related information. The match reporting API call may also include an indication of whether the matchmaking process is continuing or complete. If the matchmaking process is continuing, this means that the customer-generated matchmaking algorithm 110 is still evaluating a given set (e.g., batch) of the matchmaking tickets 111 and player characteristic data 121 and still attempting to form matches between players. If the matchmaking process is complete, this means that the customer-generated matchmaking algorithm 110 is finished evaluating a given set of the matchmaking tickets 111 and player characteristic data 121 and is no longer attempting to form matches between players. Thus, the match reporting API call may be issued multiple times by the customer-generated matchmaking algorithm 110 for a given set of the matchmaking tickets 111. This may allow the customer-generated matchmaking algorithm 110 to report matches as they are determined, as opposed to waiting to find all matches and then reporting all determined matches at once. For example, a first API call may be issued to report a first determined match, and this first API call may indicate that the matchmaking status is continuing. A second API call (and optionally additional API calls) may then subsequently be issued to report additional matches that are determined after the first API call. It is not required that the customer-generated matchmaking algorithm must find a match for every player that is included in a set of matchmaking tickets 111.

In the example of FIG. 1, the match reports 131 may be received by a game proxy service 103, which may receive and process incoming customer communications. The match reports 131 may then be provided to a matchmaking service 102, which may generally manage the matchmaking process. The match reports 131 may then be provided to the matchmaker worker service 101. Upon receipt of the match reports 131, the multi-tenant gaming service 100 may proceed to perform various operations associated with implementation of the match. For example, if the players are matched into a new game session, the multi-tenant gaming service 100 may launch the new game session and host execution of the new game session. Additionally, the matched players may connect to the game session. Furthermore, in some examples, when the customer-generated matchmaking algorithm 110 has completed the matchmaking evaluation process for a given set of matchmaking tickets 111, this may also be reported via the match reports 131 (e.g., by indicating that the matchmaking status is complete in the match reporting API call). Upon receiving a report that the matchmaking status is complete, the matchmaker worker service 101 may provide a subsequent set of matchmaking tickets 111 to the customer-generated matchmaking algorithm 110, and the process may be repeated.

As described above, the multi-tenant gaming service 100 is a gaming service that hosts execution of video game sessions for a plurality of different customers (e.g., video game developers). Each customer may pay the gaming service for the use of resources (e.g., game servers) that are employed to host game sessions on behalf of the customer. In some examples, the multi-tenant gaming service 100 may provide its own service-generated matchmaking algorithm. The multi-tenant gaming service 100 may allow each individual customer to select either a service-generated matchmaking algorithm or a customer-generated matchmaking algorithm for use in matching players to game sessions hosted on behalf of the customer. In some examples, the multi-tenant gaming service 100 may provide a matchmaking configuration application programming interface (API) call, which may be issued by a customer and may allow the customer to indicate whether a service-generated matchmaking algorithm or a customer-generated matchmaking algorithm will be used for a respective group of video game sessions.

Figure 2:
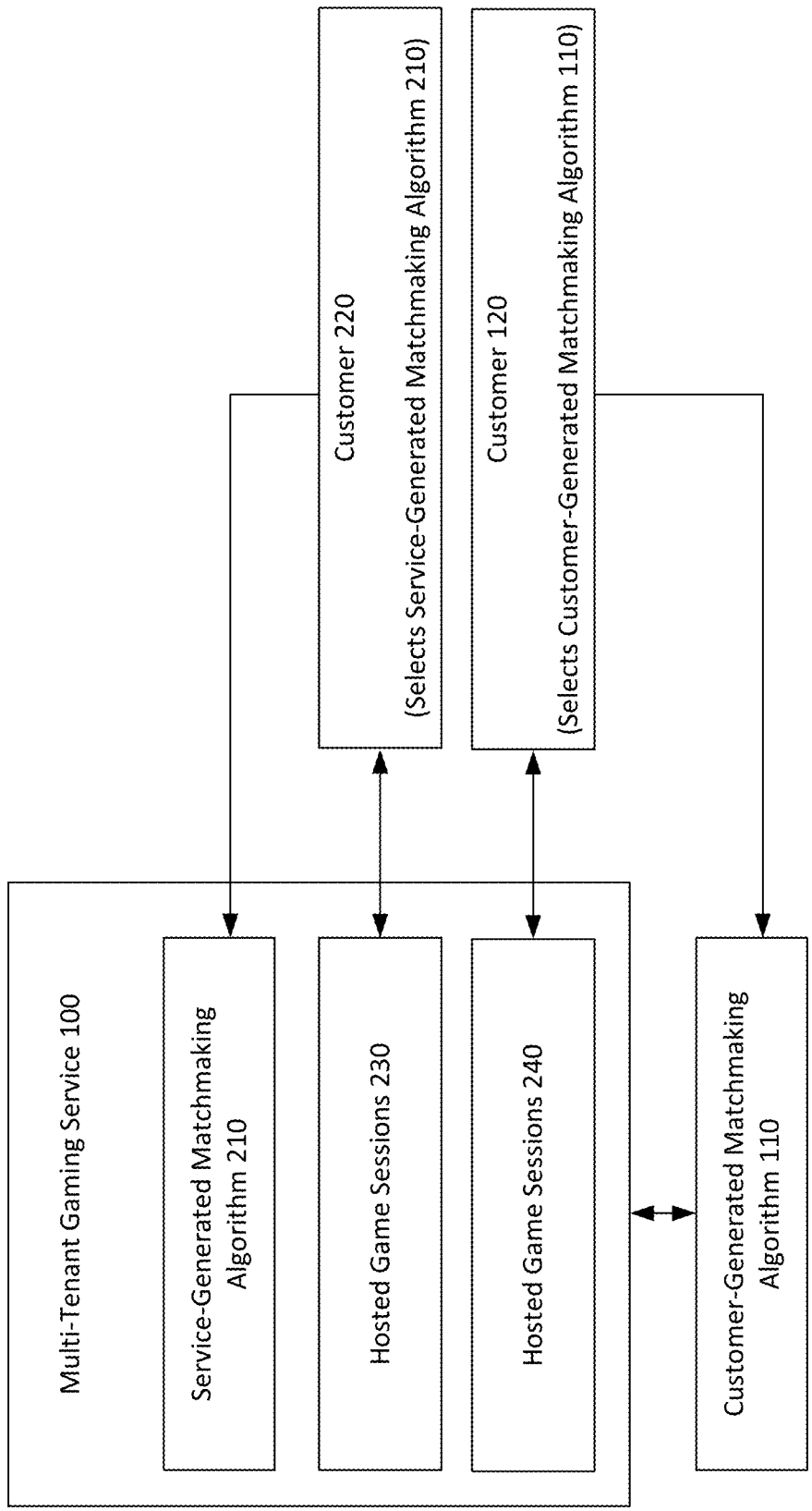
FIG. 2 is a diagram illustrating example matchmaking algorithm selections that may be used in accordance with the present disclosure.

Referring now to FIG. 2, an example is shown in which multi-tenant gaming service 100 allows different customers to select either service-generated matchmaking algorithm 210 or customer-generated matchmaking algorithm 110 for use in player matchmaking. Specifically, the multi-tenant gaming service 100 has customer 120 and customer 220 (as well as any number of additional customers not shown in FIG. 2). The multi-tenant gaming service 100 hosts execution of hosted game sessions 240 on behalf of customer 120. Similarly, the multi-tenant gaming service 100 hosts execution of hosted game sessions 230 on behalf of customer 220. In the example, of FIG. 2, customer 120 selects to use customer-generated matchmaking algorithm 110 for hosted game sessions 240, while customer 220 selects to use service-generated matchmaking algorithm 210 for hosted game sessions 230.

It is noted that, in some examples, multi-tenant gaming service 100 may allow even a single customer to select to use customer-generated matchmaking algorithm 110 for one subset of the customer's hosted game sessions and to use service-generated matchmaking algorithm 210 for another subset of the customer's hosted game sessions. For example, the customer-generated matchmaking algorithm 110 could be selected for game sessions in a given region and for a given game title, game level and/or game fleet, while the service-generated matchmaking algorithm 210 could be selected for game sessions in a different region and for a different game title, game level and/or game fleet.

As described above, in some examples, each of the matchmaking tickets 111 that is provided to the customer-generated matchmaking algorithm 110 may include a link to corresponding player characteristic data 121 for the player(s) to which the ticket corresponds. The link may be used, by the customer-generated matchmaking algorithm 110, to retrieve the corresponding player characteristic data 121 from the data storage service 122. In some cases, this may be a time-limited link that is only valid for a configurable time period, such as a pre-signed URL. The use of a time-limited link may help to improve security for the player characteristic data 121, such as by limiting access to the player characteristic data 121 to only a configurable time period after the time limited link is activated. In some examples, the time-limited link may be activated just before the matchmaking tickets are provided to the customer-generated matchmaking algorithm 110.

Figure 3:
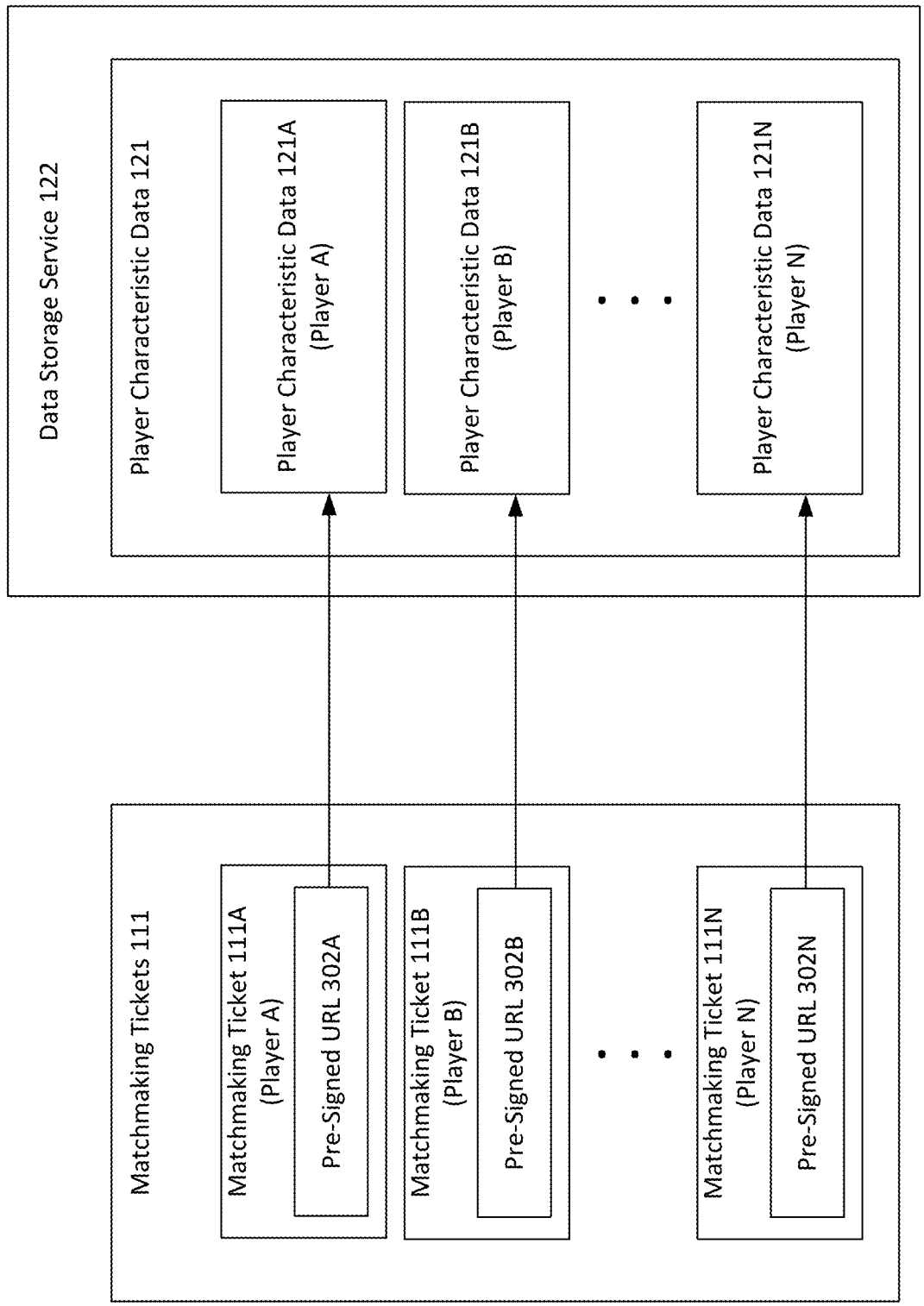
FIG. 3 is a diagram illustrating example matchmaking tickets with pre-signed uniform resource locators (URL's) that may be used in accordance with the present disclosure.

Referring now to FIG. 3, examples are shown of pre-signed URL's 302A-N that may be included in matchmaking tickets 111. In the example of FIG. 3, matchmaking tickets 111 include matchmaking ticket 111A, matchmaking ticket 111B and matchmaking ticket 111N. Matchmaking ticket 111A corresponds to Player A, matchmaking ticket 111B corresponds to Player B, and Matchmaking ticket 11 IN corresponds to Player N. Additionally, player characteristic data 121A corresponds to Player A and matchmaking ticket 111A, player characteristic data 121B corresponds to Player B and matchmaking ticket 111B, and player characteristic data 121N corresponds to Player N and matchmaking ticket 111N. As shown, matchmaking ticket 111A includes a pre-signed URL 302A, which is usable to access player characteristic data 121A. Additionally, matchmaking ticket 111B includes a pre-signed URL 302B, which is usable to access player characteristic data 121B. Furthermore, matchmaking ticket 111N includes a pre-signed URL 302N, which is usable to access player characteristic data 121N. Thus, the use of pre-signed URL's 302A-N may improve the security of the player characteristic data 121A-N. By activating the pre-signed URL's 302A-N just before the matchmaking tickets 111A-N are provided to the customer-generated matchmaking algorithm 110, the duration during which the pre-signed URL's 302A-N are valid will likely correspond to the time that the customer-generated matchmaking algorithm 110 will evaluate the player characteristic data 121A-N and attempt to find matches for players corresponding to matchmaking tickets 111A-N (Players A-N). In some examples, the duration of the configurable time period during the pre-signed URL's 102A-N are valid may be based on a typical time period that is required to find matches. This may provide security by having the pre-signed URL's 102A-N remain valid only for an expected time period during which the customer-generated matchmaking algorithm 110 may be expected to access the player characteristic data 121A-N. It is noted that FIG. 3 shows an example in which each of matchmaking tickets 111A-N includes a respective pre-signed URL 102A-N. It is noted, however, that there is no requirement that there must be a one-to-one relationship between matchmaking tickets and pre-signed URL's. For example, in some cases, multiple matchmaking tickets may have associated player characteristic data that is accessed via a single pre-signed URL. As another example, in some cases, a single matchmaking ticket could have associated player characteristic data that is accessed via multiple pre-signed URL's.

Referring back to FIG. 1, it is shown that, when the customer-generated matchmaking algorithm 110 finds matches between players, the customer-generated matchmaking algorithm 110 may submit match reports 131 back to the multi-tenant gaming service 100. The match reports 131 are reports of matches that are determined by the customer-generated matchmaking algorithm 110. As described above, in some examples, the match reports 131 may be made via a match reporting API call of the multi-tenant gaming service 100. In one specific example, for each match determined by the customer-generated matchmaking algorithm, the match reporting API call may include indications of the players within the match, mappings between the players and their respective teams, and other related information. The match reporting API call may also include an indication of whether the matchmaking process is continuing or complete.

Figure 4:
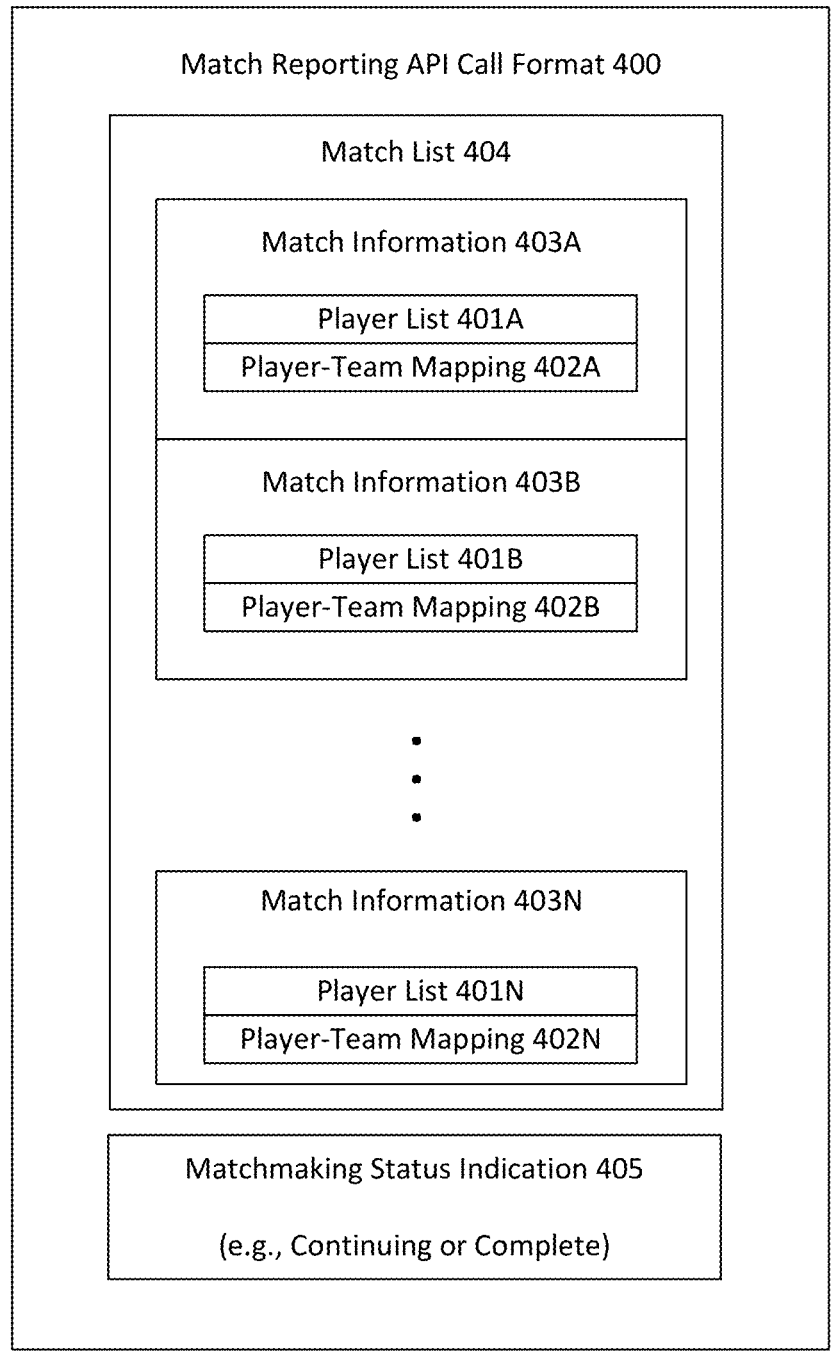
FIG. 4 is a diagram illustrating an example match reporting application programming interface (API) call format that may be used in accordance with the present disclosure.

Referring back to FIG. 4, an example of a match reporting API call format 400 will now be described in detail. As shown in FIG. 4, the reporting API call format 400 includes match list 404, which a list that includes match information 403A-N for each match that is being reported in a given match reporting API call. In this example, the match information 403A-N includes player lists 401A-N, respectively, and player-team mappings 402A-N, respectively. Each player list 401A-N includes a listing of players that are included in a respective match. Additionally, each player-team mapping 402A-N includes a mapping of players, to teams, for the respective match. For example, player information 403A may provide information for a first match. Player list 401A may provide a listing of players that are included in the first match. Player-team mapping 402A may provide a mapping of each player listed, in player list 401A, to a respective team. As another example, player information 403B may provide information for a second match. Player list 401B may provide a listing of players that are included in the second match. Player-team mapping 402B may provide a mapping of each player listed, in player list 401B, to a respective team. It is noted that match information 403A-N may additionally, or alternatively, include other information, such as a mapping of player to characters, map information, and the like.

In the example of FIG. 4, the reporting API call format 400 also includes matchmaking status indication 405. In some examples, the matchmaking status indication 405 may indicate that the matchmaking status is continuing or complete. If the matchmaking status is continuing, this means that the customer-generated matchmaking algorithm 110 is still evaluating a given set (e.g., batch) of the matchmaking tickets 111 and player characteristic data 121 and still attempting to form matches between players. If the matchmaking status is complete, this means that the customer-generated matchmaking algorithm 110 is finished evaluating a given set of the matchmaking tickets 111 and player characteristic data 121 and is no longer attempting to form matches between players (and that the customer-generated matchmaking algorithm 110 is ready to receive and evaluate a next set of matchmaking tickets).

In some examples, a timeout period may be selected for reporting of matches. The timeout period may be a configurable time duration within which the customer-generated matchmaking algorithm is required to respond to the gaming service in order to continue the matchmaking process. In some examples, if the customer-generated matchmaking algorithm does not respond to the gaming service with the matchmaking timeout period, then the matchmaking process may be assumed to be completed for a current set of matchmaking tickets, and a subsequent set of matchmaking tickets may be sent to the customer-generated matchmaking algorithm. The timeout period may be initiated when a current set of matchmaking tickets is provided to the customer-generated matchmaking algorithm. The timeout period may also be restarted after receipt of a match reporting API call or other match report. The purpose of the timeout period may be to avoid creating a permanent delay in scenarios when the customer-generated matchmaking algorithm is incapable of finding matches for a current set of matchmaking tickets. This may occur when the customer-generated matchmaking algorithm is not executing due to an outage, is experiencing a bug or other error condition, or is otherwise incapable of finding matches for a current set of matchmaking tickets. In some examples, in order to avoid exceeding the timeout period, the customer-generated matchmaking algorithm may issue a match reporting API call prior to the expiration of the timeout period. If no matches have been found, the match reporting API call may include an empty match list (i.e., with no match information) and a matchmaking status of continuing.

Referring now to FIG. 5, some example match reporting API calls 501 and 502 will now be described in detail. In the example of FIG. 5, the customer-generated matchmaking algorithm 110 may first issue match reporting API call 501 and then subsequently (at a later time) issue match reporting API call 502. As shown in FIG. 5, match reporting API call 501 is used to report two matches, which are Match AAA and Match BBB. Specifically, Match AAA is a match between Player A and Player B. Player A is mapped to Team 001, while Player B is mapped to Team 002. Additionally, Match BBB is a match between Player C and Player D. Player C is mapped to Team 003, while Player D is mapped to Team 004. Furthermore, match reporting API call 501 includes a matchmaking status of continuing, which indicates that the customer-generated matchmaking algorithm 110 is still evaluating a given set (e.g., batch) of the matchmaking tickets 111 and player characteristic data 121 and still attempting to form matches between players. As also shown in FIG. 5, match reporting API call 502 is used to report only a single match, which is Match CCC. Specifically, Match CCC is a match between Player E, Player F, Player G and Player H. Players E and G are mapped to Team 005, while Players F and H are mapped to Team 006. Furthermore, match reporting API call 502 includes a matchmaking status of complete, which indicates that the customer-generated matchmaking algorithm 110 is finished evaluating a given set of the matchmaking tickets 111 and player characteristic data 121 and is no longer attempting to form matches between players (and that the customer-generated matchmaking algorithm 110 is ready to receive and evaluate a next set of matchmaking tickets). It is noted that, while many of the above examples relate to scenarios in which multiple players are included in a match, there may be scenarios in which only a single player is included in a match. For example, a single player could be matched with a bot, such as when the single player cannot be successfully matched with any other available players.

Figure 6:
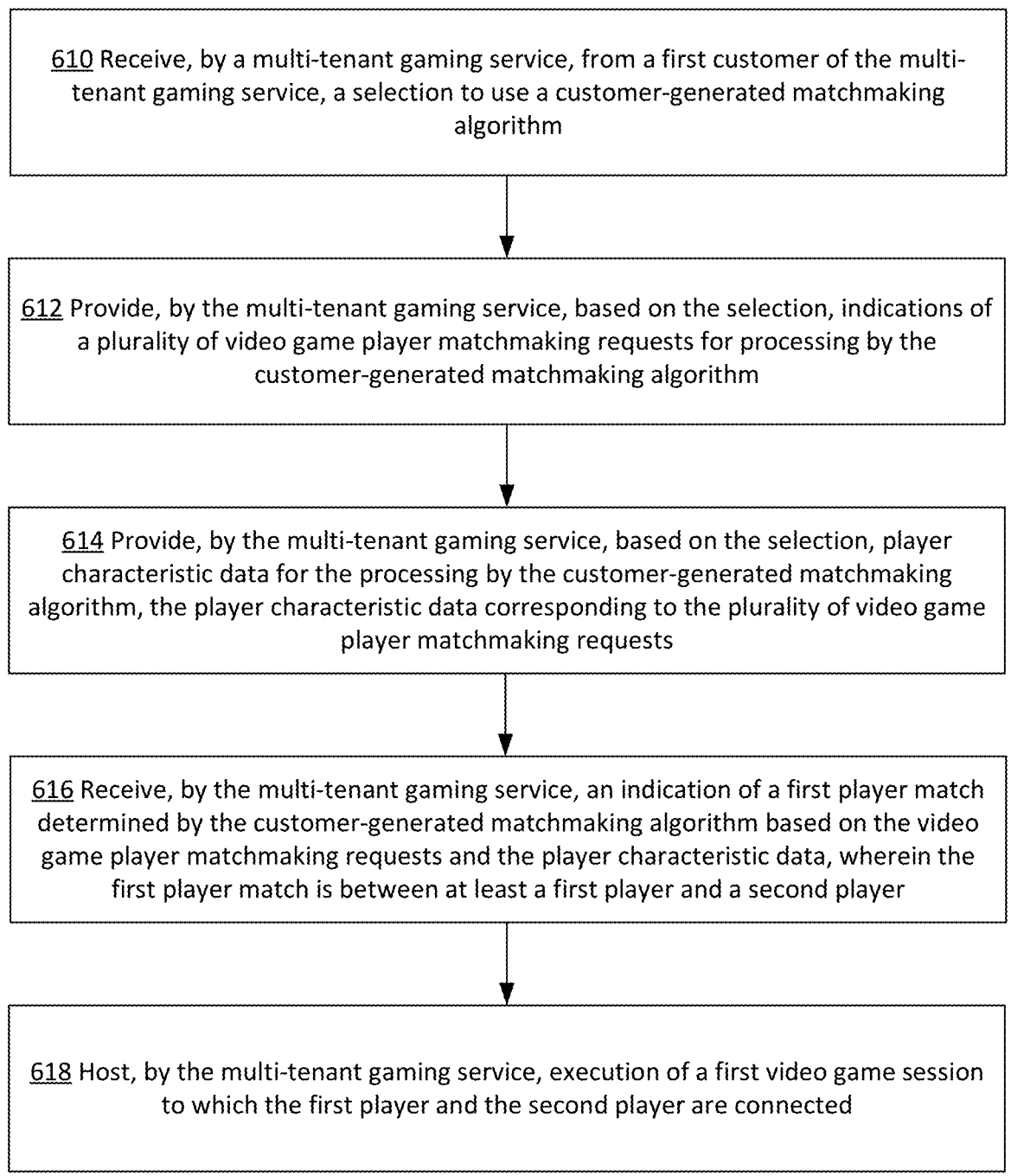
FIG. 6 is a flowchart illustrating an example customer-generated matchmaking algorithm implementation process that may be used in accordance with the present disclosure.

FIG. 6 is a flowchart illustrating an example customer-generated matchmaking algorithm implementation process that may be used in accordance with the present disclosure. The process of FIG. 6 is initiated at operation 610, at which a selection to use a customer-generated matchmaking algorithm is received, by a multi-tenant gaming service, from a first customer of the multi-tenant gaming service. As described above, the multi-tenant gaming service hosts video games for a plurality of customers including the first customer. For example, as shown FIG. 2, a first customer (e.g., customer 120) may select to use customer-generated matchmaking algorithm 110 for matching players to game sessions. In some examples, the selection to use the customer-generated matchmaking algorithm may be received via a create matchmaking configuration API call, which may be issued by a customer and may allow the customer to indicate whether a service-generated matchmaking algorithm or a customer-generated matchmaking algorithm will be used for a respective group of video game sessions. As also described above, in some examples, the multi-tenant gaming service may provide a service-generated matchmaking algorithm. The multi-tenant gaming service may allow the first customer (and other customers) to select between usage of the customer-generated matchmaking algorithm or the service-generated matchmaking algorithm. For example, as shown FIG. 2, a second customer (e.g., customer 220) may select to use service-generated matchmaking algorithm 210 for matching players to game sessions.

At operation 612, indications of a plurality of video game player matchmaking requests are provided, by the multi-tenant gaming service, based on the selection, for processing by the customer-generated matchmaking algorithm. In some examples, the providing of the video game player matchmaking requests may be performed via a publish and subscribe protocol. For example, as shown in FIG. 1, matchmaking tickets 111 are provided are provided by the multi-tenant gaming service 100, to the customer-generated matchmaking algorithm 110, via publish and subscribe protocol 112. As described above, the matchmaking tickets 111 are indications of a plurality of video game player matchmaking requests. As also described above, the matchmaking tickets 111 may be provided one set (e.g., batch) at a time to the customer-generated matchmaking algorithm 110.

At operation 614, player characteristic data is provided, by the multi-tenant gaming service, based on the selection, for the processing by the customer-generated matchmaking algorithm, the player characteristic data corresponding to the plurality of video game player matchmaking requests. For example, the player characteristic data may correspond to the video game player matchmaking requests by including data regarding characteristics of players for whom the matchmaking requests are issued. In some examples, the indications of the plurality of video game player matchmaking requests may include links that allow the player characteristic data to be obtained from a data store. Additionally, in some examples, the links may be valid only for a limited time duration. For example, in some cases, the indications of the plurality of video game player matchmaking requests may include pre-signed URL's that allow the player characteristic data to be obtained from a data store. Referring back to FIG. 3, it is shown that matchmaking tickets 111A-N may include pre-signed URL's 302A-N, respectively, for accessing player characteristic data 121A-N, respectively. In some examples, the player characteristic data may indicate characteristics, such as player skill levels, desired characters that the players would like to control, game maps that the players would like to play on, and the like.

The indications of the plurality of video game player matchmaking requests and the player characteristic data may be used, by the customer-generated matchmaking algorithm to determine matches between players. In some examples, customer-generated matchmaking algorithm may be executed using a serverless computing function that is triggered based on receipt of the indications of the plurality of video game player matchmaking requests. At operation 616, an indication of a first player match determined by the customer-generated matchmaking algorithm is received, by the multi-tenant gaming service. The first player match is determined, by the customer-generated matchmaking algorithm, based on the video game player matchmaking requests and the player characteristic data. The first player match is between at least a first player and a second player. In some examples, the indication of the first player match may be received via a match reporting API call of the multi-tenant gaming service. As described above, in some examples, the match reporting API call may optionally include indications of one or more matches that are determined by the customer-generated matchmaking algorithm, including indications of the players included in each match and a player-team mapping. Thus, the indication of the first player match may include player-team mappings. The match reporting API call may also include a matchmaking status indication, such as whether matchmaking status is continuing or complete. If the matchmaking status is continuing, this means that the customer-generated matchmaking algorithm is still evaluating a current set (e.g., batch) of the matchmaking tickets and player characteristic data and still attempting to form matches between players. If the matchmaking status is complete, this means that the customer-generated matchmaking algorithm is finished evaluating a current set of the matchmaking tickets and player characteristic data and is no longer attempting to form matches between players (and that the customer-generated matchmaking algorithm is ready to receive and evaluate a next set of matchmaking tickets).

At operation 618, execution of a first video game session to which the first player and the second player are connected is hosted, by the multi-tenant gaming service. The first player and the second player may be connected to the first video game session based on the first player match. For example, in some cases, if the first player and the second player are matched to a new video game session, then the new video game session may be launched by the video gaming service. In other examples, the first player and the second player may be matched to a pre-existing video game session, such as to replace players that exited the pre-existing video game session. In one specific example, a match may be assigned to a server and player sessions may be created for each player (e.g., the first player and the second player). Each player session may include a respective universally unique identifier (UUID). Each player session may be shared with the respective player. When a player connects to the game session, the player may present the player session (e.g., UUID). A validation process may then be performed to match a player identifier for the player with the player session. When the presented player session and the player identifier are a valid match, then the player may access the game session.

Figure 7:
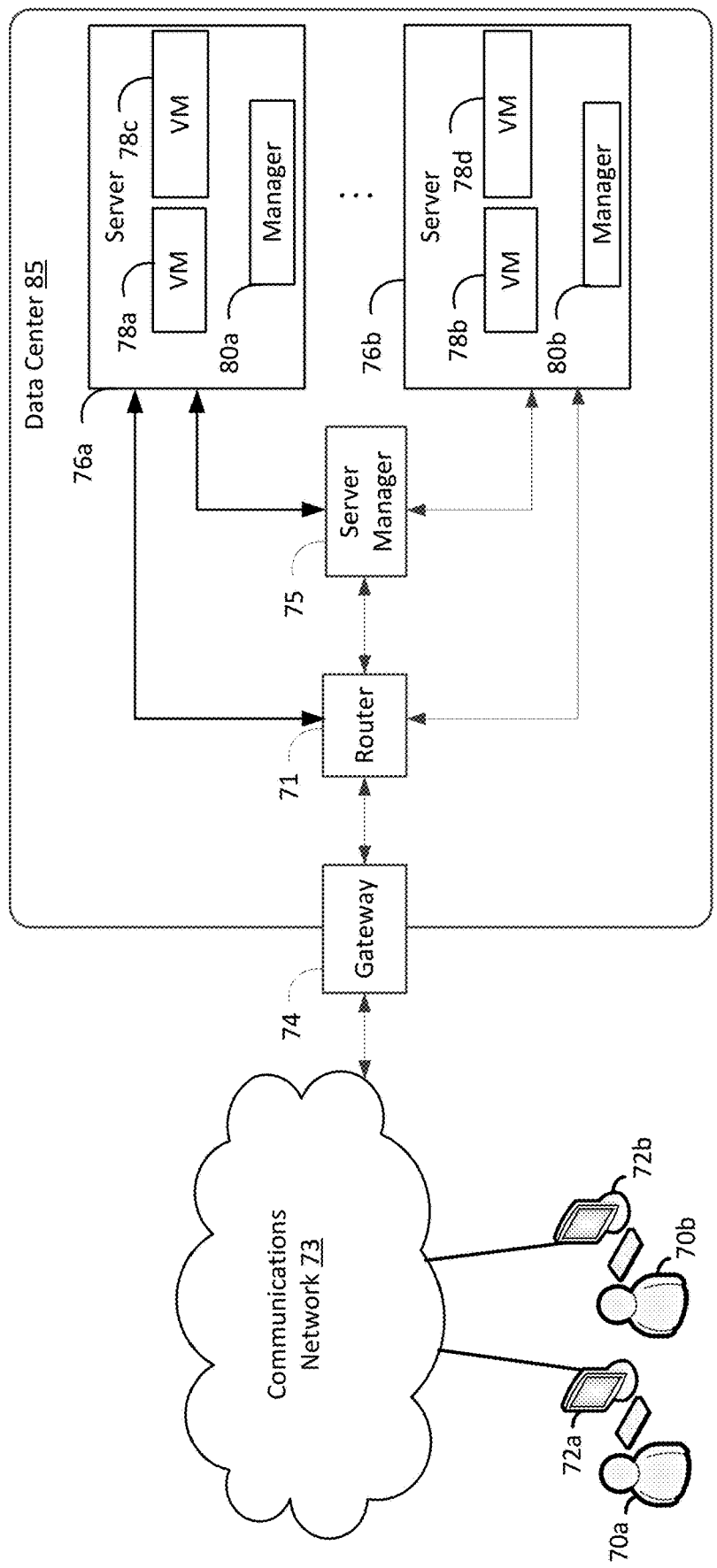
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
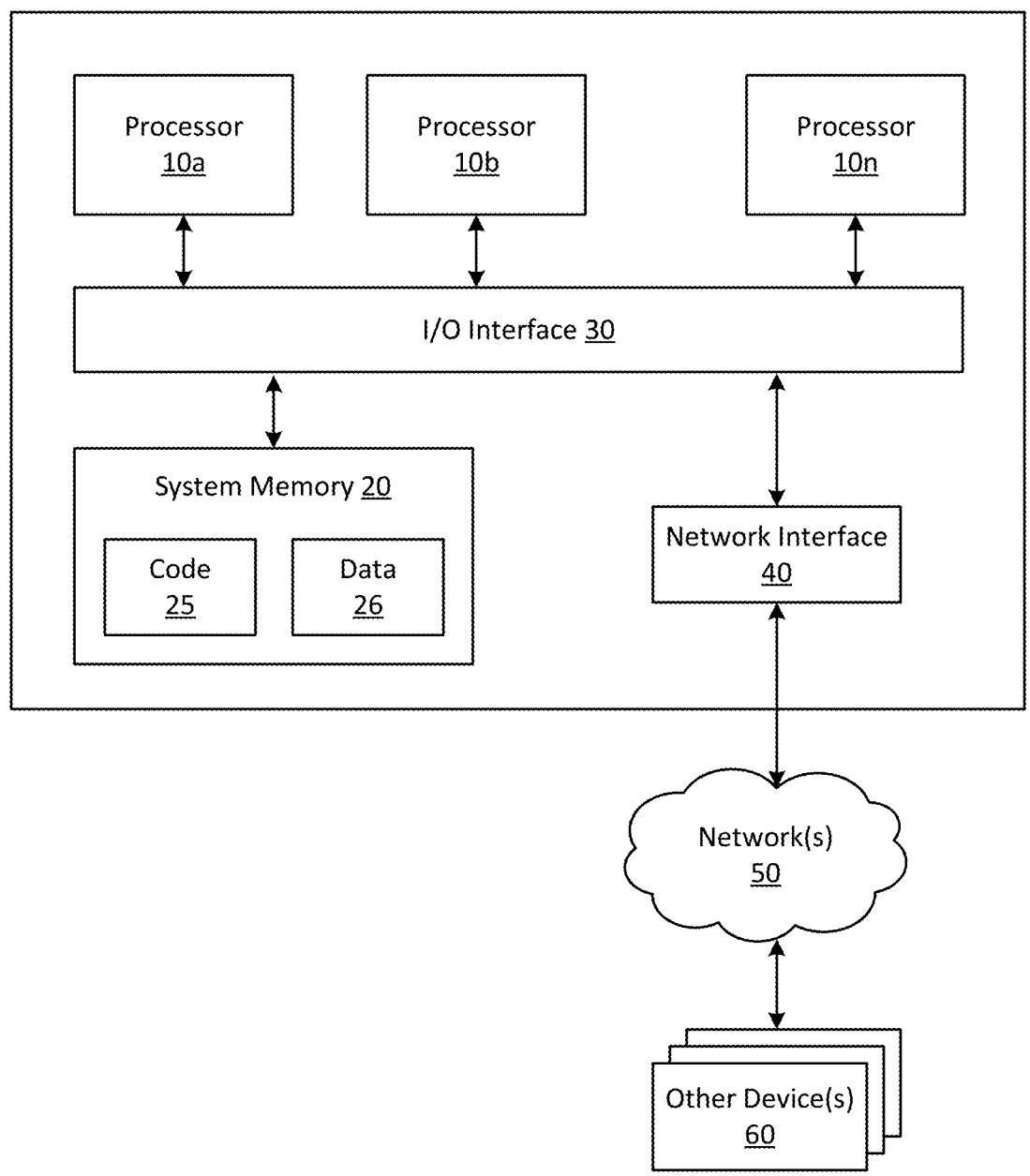
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored thereon instructions that, when executed by the one or more processors, cause the computing system to perform operations comprising:
      receiving, by a multi-tenant gaming service, from a first customer of the multi-tenant gaming service, a selection to use a customer-generated matchmaking algorithm, wherein the multi-tenant gaming service hosts video games for a plurality of customers including the first customer, wherein the multi-tenant gaming service provides a service-generated matchmaking algorithm, and wherein the multi-tenant gaming service allows the first customer to select between usage of the customer-generated matchmaking algorithm or the service-generated matchmaking algorithm;
      providing, by the multi-tenant gaming service, based on the selection, indications of a plurality of video game player matchmaking requests for processing by the customer-generated matchmaking algorithm;
      providing, by the multi-tenant gaming service, based on the selection, player characteristic data for the processing by the customer-generated matchmaking algorithm, the player characteristic data corresponding to the plurality of video game player matchmaking requests;
      receiving, by the multi-tenant gaming service, an indication of a first player match determined by the customer-generated matchmaking algorithm based on the video game player matchmaking requests and the player characteristic data, wherein the first player match is between at least a first player and a second player; and
      hosting, by the multi-tenant gaming service, execution of a first video game session to which the first player and the second player are connected.

2. The computing system of claim 1, wherein the providing of the video game player matchmaking requests is performed via a publish and subscribe protocol.

3. The computing system of claim 1, wherein the indications of the plurality of video game player matchmaking requests include pre-signed uniform resource locators (URL's) that allow the player characteristic data to be obtained from a data store.

4. The computing system of claim 1, wherein the indication of the first player match is received via an application programming interface (API) call of the multi-tenant gaming service.

5. The computing system of claim 1, further comprising executing the customer-generated matchmaking algorithm using a serverless computing function that is triggered based on receipt of the indications of the plurality of video game player matchmaking requests.

6. The computing system of claim 1, wherein the indication of the first player match includes player-team mappings.

7. A computer-implemented method comprising:
   receiving, by a multi-tenant gaming service, from a first customer of the multi-tenant gaming service, a selection to use a customer-generated matchmaking algorithm, wherein the multi-tenant gaming service hosts video games for a plurality of customers including the first customer, wherein the multi-tenant gaming service provides a service-generated matchmaking algorithm, and wherein the multi-tenant gaming service allows the first customer to select between usage of the customer-generated matchmaking algorithm or the service-generated matchmaking algorithm;
   providing, by the multi-tenant gaming service, based on the selection, indications of a plurality of video game player matchmaking requests for processing by the customer-generated matchmaking algorithm;
   providing, by the multi-tenant gaming service, based on the selection, player characteristic data for the processing by the customer-generated matchmaking algorithm, the player characteristic data corresponding to the plurality of video game player matchmaking requests;
   receiving, by the multi-tenant gaming service, an indication of a first player match determined by the customer-generated matchmaking algorithm based on the video game player matchmaking requests and the player characteristic data, wherein the first player match is between at least a first player and a second player; and
   hosting execution of a first video game session to which the first player and the second player are connected based on the first player match.

8. The computer-implemented method of claim 7, wherein the providing of the video game player matchmaking requests is performed via a publish and subscribe protocol.

9. The computer-implemented method of claim 7, further comprising executing the customer-generated matchmaking algorithm using a serverless computing function that is triggered based on receipt of the indications of the plurality of video game player matchmaking requests.

10. The computer-implemented method of claim 7, wherein the indications of the plurality of video game player matchmaking requests include links that allow the player characteristic data to be obtained from a data store.

11. The computer-implemented method of claim 10, wherein the links are valid only for a limited time duration.

12. The computer-implemented method of claim 7, wherein the indication of the first player match is received via an application programming interface (API) call of the multi-tenant gaming service.

13. The computer-implemented method of claim 7, wherein the indication of the first player match includes player-team mappings.

14. One or more non-transitory computer-readable storage media having stored thereon computing instructions that, upon being executed by a computing system, cause the computing system to perform operations comprising:

receiving, by a multi-tenant gaming service, from a first customer of the multi-tenant gaming service, a selection to use a customer-generated matchmaking algorithm, wherein the multi-tenant gaming service hosts video games for a plurality of customers including the first customer, wherein the multi-tenant gaming service provides a service-generated matchmaking algorithm, and wherein the multi-tenant gaming service allows the first customer to select between usage of the customer-generated matchmaking algorithm or the service-generated matchmaking algorithm;

providing, by the multi-tenant gaming service, based on the selection, indications of a plurality of video game player matchmaking requests for processing by the customer-generated matchmaking algorithm;

providing, by the multi-tenant gaming service, based on the selection, player characteristic data for the processing by the customer-generated matchmaking algorithm, the player characteristic data corresponding to the plurality of video game player matchmaking requests;

receiving, by the multi-tenant gaming service, an indication of a first player match determined by the customer-generated matchmaking algorithm based on the video game player matchmaking requests and the player characteristic data, wherein the first player match is between at least a first player and a second player; and hosting execution of a first video game session to which the first player and the second player are connected based on the first player match.

15. The one or more non-transitory computer-readable storage media of claim 14, wherein the providing of the video game player matchmaking requests is performed via a publish and subscribe protocol.

16. The one or more non-transitory computer-readable storage media of claim 14, wherein the indication of the first player match includes player-team mappings.

17. The one or more non-transitory computer-readable storage media of claim 14, wherein the indications of the plurality of video game player matchmaking requests include pre-signed uniform resource locators (URL's) that allow the player characteristic data to be obtained from a data store.

18. The one or more non-transitory computer-readable storage media of claim 14, wherein the indication of the first player match is received via an application programming interface (API) call of the multi-tenant gaming service.

19. The one or more non-transitory computer-readable storage media of claim 14, wherein the operations further comprise executing the customer-generated matchmaking algorithm using a serverless computing function that is triggered based on receipt of the indications of the plurality of video game player matchmaking requests.

* * * * *